United States Patent
Alexander, Jr. et al.

(10) Patent No.: US 9,112,723 B2
(45) Date of Patent: Aug. 18, 2015

(54) SERVICE NODE USING SERVICES APPLIED BY AN APPLICATION NODE

(75) Inventors: Cedell Adam Alexander, Jr., Durham, NC (US); Christopher Y. Metz, Danville, CA (US); Jim Guichard, New Boston, NH (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 369 days.

(21) Appl. No.: 12/827,157

(22) Filed: Jun. 30, 2010

(65) Prior Publication Data
US 2012/0002672 A1      Jan. 5, 2012

(51) Int. Cl.
H04L 12/46       (2006.01)

(52) U.S. Cl.
CPC .................................. *H04L 12/4633* (2013.01)

(58) Field of Classification Search
CPC ............. H04L 12/4641–12/467; H04L 45/06; H04L 47/20; H04L 63/02–63/029; H04L 12/4633
USPC ............ 370/395.53, 400, 409, 397, 399, 401; 709/203, 219; 726/12, 13, 15
See application file for complete search history.

(56) References Cited

U.S. PATENT DOCUMENTS

| | | | |
|---|---|---|---|
| 7,558,273 B1 * | 7/2009 | Grosser et al. | 370/395.53 |
| 7,860,100 B2 | 12/2010 | Khalid et al. | |
| 7,948,986 B1 * | 5/2011 | Ghosh et al. | 370/392 |
| 2006/0062218 A1 * | 3/2006 | Sasagawa | 370/389 |
| 2006/0233155 A1 * | 10/2006 | Srivastava | 370/351 |
| 2007/0115913 A1 * | 5/2007 | Li et al. | 370/349 |
| 2007/0237147 A1 * | 10/2007 | Quinn et al. | 370/392 |
| 2008/0177896 A1 * | 7/2008 | Quinn et al. | 709/238 |
| 2008/0198849 A1 * | 8/2008 | Guichard et al. | 370/392 |
| 2008/0276085 A1 * | 11/2008 | Davidson et al. | 713/161 |
| 2008/0320303 A1 * | 12/2008 | Khalid et al. | 713/163 |
| 2009/0037713 A1 | 2/2009 | Khalid et al. | |
| 2010/0058329 A1 | 3/2010 | Durazzo et al. | |
| 2010/0165985 A1 | 7/2010 | Sharma et al. | |
| 2010/0254385 A1 | 10/2010 | Sharma et al. | |
| 2011/0161494 A1 * | 6/2011 | McDysan et al. | 709/225 |
| 2012/0026897 A1 | 2/2012 | Guichard et al. | |
| 2012/0027016 A1 | 2/2012 | Filsfils et al. | |
| 2012/0033663 A1 | 2/2012 | Guichard et al. | |
| 2012/0033664 A1 | 2/2012 | Pignataro et al. | |
| 2012/0063450 A1 | 3/2012 | Pignataro et al. | |

* cited by examiner

*Primary Examiner* — Un C Cho
*Assistant Examiner* — Jeremy Costin
(74) *Attorney, Agent, or Firm* — The Law Office of Kirk D. Williams

(57) ABSTRACT

Packets are encapsulated and sent from a service node to an application node for applying one or more Layer-4 to Layer-7 services to the packets, with service-applied packets being returned to the service node. An identification of a virtual private network (VPN) may be carried within a request packet, encapsulating a particular packet, sent by a service node to an application node for applying a service to the particular packet; with the corresponding response packet sent to the service node including an identification of the VPN for use by the service node node in forwarding the services-applied packet. Additionally, parameters may be included in a request packet to identify a particular service of a general service to be applied to a particular packet encapsulated in the request packet.

24 Claims, 6 Drawing Sheets

SERVICE DEFINITION AT
SERVICE NODE
(PACKET SWITCHING DEVICE)
250

```
251 ──▶ ServiceWire service-path <service-path-name>
   252 ──▶ description <text>
   253 ──▶ nexthop <ip-address> service-id <service-id>
   254 ──▶ [backup-nexthop <ip-address> service-id <service-id>]
   255 ──▶ mode hairpin
```

FIGURE 2B

SERVICEWIRE
REQUEST
PACKET
280

| |
|---|
| 281 — INFORMATION TO GET REQUEST PACKET FROM THE SERVICE NODE TO THE (FIRST) APPLICATION NODE (E.G., MPLS, ETHERNET, GRE, HDLC, PPP PACKET) |
| 282 — SERVICEWIRE ENCAPSULATION (E.G, HEADER WITH FIRST NIBBLE AS ZERO, AND TLVS SUCH AS: SERVICE ID TLV, VPN TLV, PARAMETERS TLV DEFINING SPECIFIC SERVICE FROM THE GENERAL SERVICE CORRESPONDING TO THE SERVICE ID) |
| 283 — ORIGINAL PACKET (E.G., IP PACKET) |

FIGURE 2C

SERVICE DEFINITION AT
APPLICATION NODE
350

```
351  ► ServiceWire    <service-name>
  352  ► description   <text>
  353  ► service-id    <service-id>
  354  ► input         <input-service-interface>
  355  ► output        <output-service-interface>
  356  ► ((nexthop     <ip-address>
                       ([optimize-l2] | [rewrite-service-id <service-id>]))
```

SERVICE NODE USING SERVICES APPLIED BY AN APPLICATION NODE

TECHNICAL FIELD

The present disclosure relates generally to communicating information in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Layer-4 to layer-7 services are often applied to packets being sent through a packet switching device. Service Insertion Architecture, such as that disclosed in US Patent Application Publication 2008/0177896 A1 published Jul. 24, 2008, teaches one approach to providing network services outside the packet switching device.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

FIG. 2B illustrates a configuration process performed in one embodiment;

FIG. 2C illustrates a packet format used in one embodiment;

DESCRIPTION OF EXAMPLE EMBODIMENTS

1. Overview

Figure 1A:
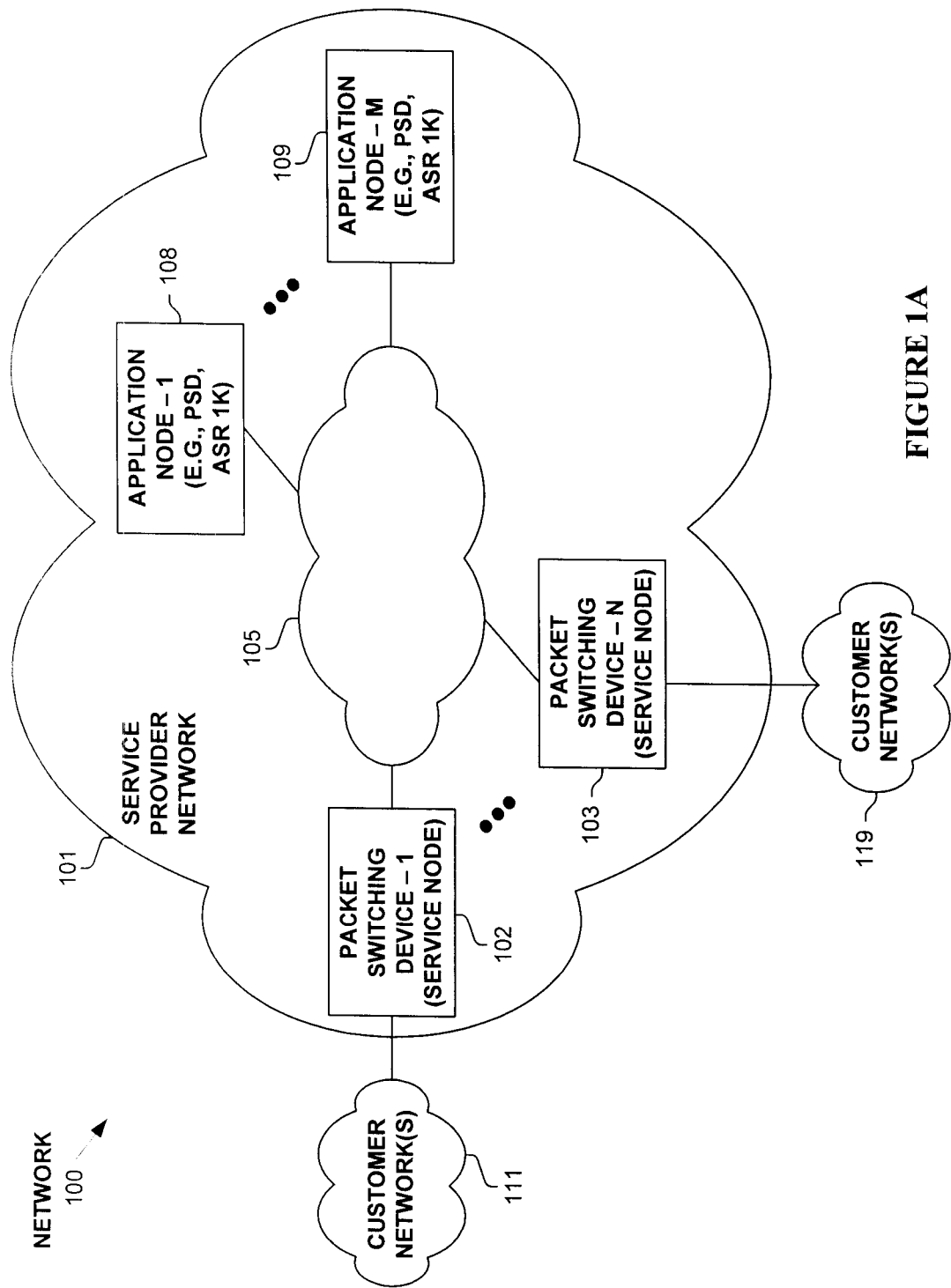
FIG. 1A illustrates a network operating according to one embodiment.

Disclosed are, inter alia, methods, apparatus, computer-storage media, mechanisms, and means associated with a service node (e.g., packet switching device) using one or more services applied to packets by an application node (e.g., a packet switching device and/or computing platform). An example of an application node used in one embodiment is a Cisco ASR 1000, which is a packet switching device with service processing capability. One embodiment includes a packet switching device, which sends packets to one or more application nodes to apply one or more services to a packet, either internally generated or received from an external source.

In one embodiment, the packet switching device performs operations, including: maintaining forwarding information for a plurality of virtual private networks (VPNs); creating a request packet corresponding to a particular packet, with the request packet including: the particular packet, a service identification of at least one service of one or more services to be applied to the particular packet by one or more application nodes, and an identification of a particular VPN associated with the particular packet; forwarding the request packet to a particular application node of said one or more application nodes; receiving a response packet corresponding to said forwarded request packet, the response packet including a service-applied packet corresponding to the particular packet after said one or more services have been applied to the particular packet by said one or more application nodes, with the response packet including a particular identification of the particular VPN; and forwarding the service-applied packet or a packet derived from the service-applied packet according to forwarding information for the particular VPN. In one embodiment, an application node performs one or more services described in a request packet to an embedded packet.

In one embodiment, the packet switching device performs operations, including: creating a request packet corresponding to a particular packet, with the request packet including: the particular packet, an identification of a general service to be applied to the particular packet by one or more application nodes, and one or more service parameters for the general service defining a particular service of the general service; forwarding the request packet to a particular application node of said one or more application nodes; receiving a response packet corresponding to said forwarded request packet, the response packet including a service-applied packet corresponding to the particular packet after at least the particular service has been applied to the particular packet by said one or more application nodes; and forwarding the service-applied packet or a packet derived from the service-applied packet from the packet switching device. In one embodiment, the request and/or response packet includes an identification of a particular virtual private network (VPN) associated with the particular packet. In one embodiment, an application node performs one or more services described in a request packet to an embedded packet.

2. Description

Disclosed are, inter alia, methods, apparatus, computer-storage media, mechanisms, and means associated with a service node (e.g., packet switching device) using one or more services applied to packets by an application node (e.g., a packet switching device and/or computing platform). Note, a particular packet having one or more services applied to it by an application node is referred to herein as a services-applied packet, regardless of whether the application of the service(s) resulted in the same particular packet, a modified particular packet, or a different packet.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device. The term "packet" refers to a data packet or frame, such as, but not limited to, an Internet Protocol (IP) packet or Ethernet frame; and the format of a packet includes at least a packet header and payload.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with a service node (e.g., a packet switching device) using one or more services applied to packets by an application node (e.g., a packet switching device and/or computing platform). One embodiment includes a method, comprising: maintaining, by a packet switching device, forwarding information for a plurality of virtual private networks (VPNs); creating, by the packet switching device, a request packet corresponding to a particular packet, with the request packet including: the particular packet, a service identification of at least one service of one or more services to be applied to the particular packet by one or more application nodes, and an identification of a particular VPN associated with the particular packet; forwarding, by the packet switching device, the request packet to a particular application node of said one or more application nodes; receiving, by the packet switching device, a response packet corresponding to said forwarded request packet, the response packet including a service-applied packet corresponding to the particular packet after said one or more services have been applied to the particular packet by said one or more application nodes, with the response packet including a particular identification of the particular VPN; and forwarding, by the packet switching device, the service-applied packet or a packet derived from the service-applied packet according to forwarding information for the particular VPN.

In one embodiment, said one or more services include at least one service from a group of services consisting of: layer-4, layer-5, layer-6, and layer-7 services. In one embodiment, said one or more services include at least one service from a group of services consisting of: Firewall (FW), Network Address Translation (NAT), Network-based Application Recognition (NBAR), authentication, encryption and Internet Protocol Security (IPsec). In one embodiment, the identification of the particular VPN is encoded in a type-length-value (TLV) element in the request packet; and wherein the particular identification of the particular VPN is encoded in a TLV element in the response packet. In one embodiment, the identification of the particular VPN in the request packet and the particular identification of the particular VPN in the response packet are each encoded in a same type-length-value (TLV) element in the respective said request and response packets. In one embodiment, the request packet includes a Multiprotocol Label Switching (MPLS) label stack for reaching the application node, immediately followed by a nibble of value zero identifying that the request packet has encoded therein service information, wherein said service information includes the service identification. In one embodiment, the response packet includes a Multiprotocol Label Switching (MPLS) label stack for reaching the packet switching device, immediately followed by a nibble of value zero identifying that the response packet has encoded therein service information, wherein said service information includes the particular identification of the particular VPN. In one embodiment, each of said one or more application nodes is external to the packet switching device. One embodiment includes: receiving, by the packet switching device, the particular packet from a node external to the packet switching device; and determining, by the packet switching device, to forward the particular packet to the particular application node for applying at least one of said one or more services to the particular packet by said one or more application nodes. In one embodiment, each of said one or more application nodes is external to the packet switching device. One embodiment includes: creating, by the packet switching device, the particular packet.

One embodiment includes a packet switching device, comprising: one or more storage devices configured for maintaining different forwarding information for each of a plurality of virtual private networks (VPNs); a first interface of a plurality of interfaces configured to receive a particular packet, with the first interface associated with a particular VPN of the plurality of VPNs; a classifier configured to determine, for a particular packet received on the first interface, to forward the particular packet to an application node of one or more application nodes, remote from the packet switching device, for applying one or more services to the particular packet by said one or more application nodes; a packet processor configured to create a request packet corresponding to the particular packet, with the request packet including: the particular packet, a service identification of at least one service of one or more services to be applied to the particular packet by said one or more application nodes, and an identification of the particular VPN; and a second interface of the plurality of interfaces configured to send the request packet to the application node; wherein the packet switching device is configured to receive a response packet, corresponding to said sent request packet, on one of the plurality of interfaces, with the response packet including a service-applied packet corresponding to the particular packet after said one or more services have been applied to the particular packet by said one or more application nodes, with the response packet including a particular identification of the particular VPN; and wherein the packet switching device is configured to forward the service-applied packet or a packet derived from the service-applied packet from one of the plurality of interfaces according to forwarding information for the particular VPN stored in at least one of said storage devices.

In one embodiment, wherein said one or more services include at least one service from a group of services consisting of: layer-4, layer-5, layer-6, and layer-7 services. In one embodiment, the identification of the particular VPN in the request packet and the particular identification of the particular VPN in the response packet are each encoded in a same type-length-value (TLV) element in the respective said request and response packets.

One embodiment includes a method, comprising: receiving, by an application node of one or more application nodes in a network, a request packet, including: a particular packet, a service identification of at least one service of one or more services to be applied to the particular packet by said one or more application nodes, and an identification of a particular virtual private network (VPN); applying, by the application node based on the service identification said received in the request packet, said at least one service to the particular packet said received in the request packet, such that the result of said applying operation is a service-applied packet corresponding to the particular packet; creating, by the application node, a response packet corresponding to said received request packet, with the response packet including: the service-applied packet, and a particular identification of the particular VPN, such that a service node can determine the forwarding information corresponding to the particular VPN; and sending the response packet to: the service node, or another application node for applying one or more additional services of said one or more services to the service-applied packet before a packet derived from the service-applied packet is communicated to the service node.

In one embodiment, said operation of applying said at least one service to the particular packet includes applying said at least one service to the particular packet based on the particular VPN. In one embodiment, the application node sends the response packet to the service node and not to said another application node. In one embodiment, the request packet includes a Multiprotocol Label Switching (MPLS) label stack for reaching the application node, immediately followed by a nibble of value zero identifying that the request packet has encoded therein service information, wherein said service information includes the service identification. One embodiment includes: identifying, by the application node based on a nibble of value zero immediately following a Multiprotocol Label Switching (MPLS) label stack for reaching the application node included in the request packet, that the request packet includes service information, wherein said service information includes the service identification and the identification of the particular VPN.

One embodiment includes a method, comprising: creating, by a packet switching device, a request packet corresponding to a particular packet, with the request packet including: the particular packet, an identification of a general service to be applied to the particular packet by one or more application nodes, and one or more service parameters for the general service defining a particular service of the general service; forwarding, by the packet switching device, the request packet to a particular application node of said one or more application nodes; receiving, by the packet switching device, a response packet corresponding to said forwarded request packet, the response packet including a service-applied packet corresponding to the particular packet after at least the particular service has been applied to the particular packet by said one or more application nodes; and forwarding the service-applied packet or a packet derived from the service-applied packet from the packet switching device.

In one embodiment, the identification of the general service and said one or more service parameters for the general service are encoded in one or more type-length-value (TLV) elements in the request packet. In one embodiment, the general service is a Firewall (FW) service, and the particular service is a service from a group consisting of: inside to outside, and outside to inside. One embodiment includes: maintaining, by a packet switching device, forwarding information for a plurality of virtual private networks (VPNs); wherein the request packet and the response packet each include an identification of a particular VPN of the plurality of VPNs, with the particular VPN associated with the particular packet; and wherein said operation of forwarding the service-applied packet or a packet derived from the service-applied packet from the packet switching device is based on said maintained forwarding information for the particular VPN. One embodiment includes: receiving, by the packet switching device, the particular packet from a node external to the packet switching device; and determining, by the packet switching device, to forward the particular packet to the particular application node for applying at least one of said one or more services to the particular packet by said one or more application nodes. In one embodiment, each of said one or more application nodes is external to the packet switching device. One embodiment includes: creating, by the packet switching device, the particular packet.

One embodiment includes: receiving, by an application node of one or more application nodes in a network, a request packet, including: a particular packet, an identification a general service to be applied to the particular packet by one or more application nodes, and one or more service parameters for the general service defining a particular service of the general service; applying, by the application node, the particular service to the particular packet, such that the result of said applying operation is a service-applied packet corresponding to the particular packet; creating, by the application node, a response packet corresponding to said received request packet, with the response packet including: the service-applied packet; and sending the response packet to: a service node, or another application node for applying one or more additional services of said one or more services to the service-applied packet before a packet derived from the service-applied packet is communicated to the service node. In one embodiment, the identification of the general service and said one or more service parameters for the general service are encoded in one or more type-length-value (TLV) elements in the request packet. In one embodiment, the request packet and the response packet each include an identification of a particular virtual private network (VPN) of a plurality of VPNs, with the particular VPN associated with the particular packet. In one embodiment, said application of the particular service to the particular packet is based on the particular VPN.

Expressly turning to the figures, FIG. 1A illustrates network 100 operating according to one embodiment, wherein a service node (e.g., packet switching device 102-103) sends a packet to an application node (108-109) for performing one or more services to the packet by one or more application nodes (108-109). Network 100 illustrates a typical configuration of a service provider network 101, which has edge packet switching devices 102-103 communicatively coupled to customer networks 111-119; and within service provider network 101, service provider nodes 102-103 and 108-109 are communicatively coupled (105).

Note, one embodiment performs the operations of sending packets to application node(s) for applying service(s) in one or more networks different than network 100; and one embodiment performs the operations of receiving packets by application node(s) for applying service(s) in one or more networks different than network 100.

As illustrated in FIG. 1A, packet switching devices 102-103 ("service nodes") are configured for sending packets to one or more application nodes 108-109 for applying one or more services, with the resulting services-applied packet being returned to the originating packet switching device (102-103). Thus, packet switching devices 102-103 do not have to have the capability for the service applied to the particular service, and allowing development of new services to be performed by an application node 108-109, without having to integrate into a packet switching device 102-103, which is typically more costly in terms of development and testing.

Figure 1B:
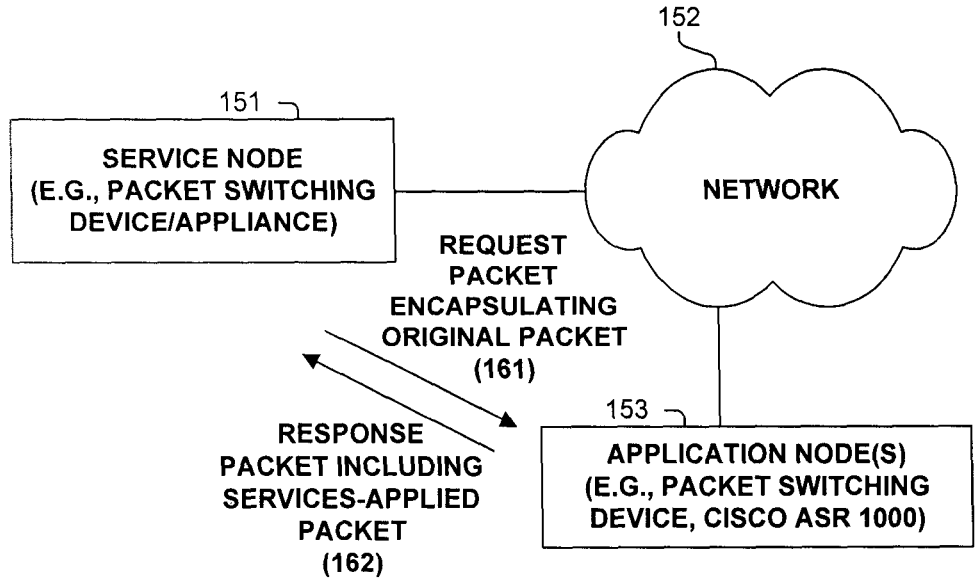
FIG. 1B illustrates a network operating according to one embodiment.

Next, shown in FIG. 1B is a generalized configuration including service node 151 (e.g., packet switching device/appliance), application node(s) 153 (e.g., packet switching device/appliance such as, but not limited to, a Cisco ASR 1000), communicatively coupled via network 152. As shown, service node 151 sends a request packet (161) encapsulating an original packet to application node(s) 153, which applies one or more services to the original packet. A response packet is sent (162) from application node(s) 153 to originating service node 151, with the response packet including the encapsulated services-applied packet (e.g., the result of one or more services being applied to the original packet, which is typically the same, or a modification of, the original packet).

Figure 1C:
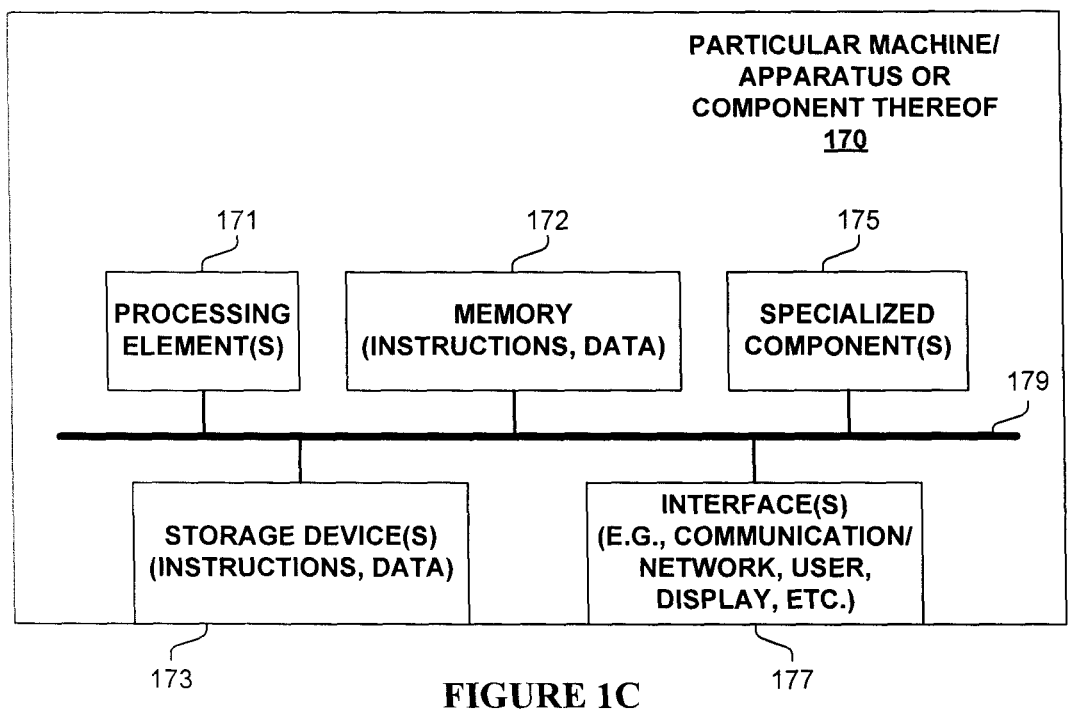
FIG. 1C illustrates an apparatus or component used in one embodiment.

FIG. 1C is a block diagram of an apparatus or component 170 used in one embodiment associated with a service node (e.g., packet switching device) using one or more services applied to packets by an application node (e.g., a packet switching device and/or computing platform). In one embodiment, apparatus or component 170 performs one or more processes corresponding to one of the flow diagrams illustrated or otherwise described herein.

In one embodiment, apparatus or component 170 includes one or more processing element(s) 171, memory 172, storage device(s) 173, specialized component(s) 175 (e.g. optimized hardware such as for performing operations, etc.), and interface(s) 177 for communicating information (e.g., sending and receiving packets, user-interfaces, displaying information, etc.), which are typically communicatively coupled via one or more communications mechanisms 179, with the communications paths typically tailored to meet the needs of the application. In one embodiment apparatus or component 170 corresponds to, or is part of, a service or application node illustrated in one of the other figures or otherwise described herein.

Various embodiments of apparatus or component 170 may include more or less elements. The operation of apparatus or component 170 is typically controlled by processing element(s) 171 using memory 172 and storage device(s) 173 to perform one or more tasks or processes. Memory 172 is one type of computer-readable/computer-storage medium, and typically comprises random access memory (RAM), read only memory (ROM), flash memory, integrated circuits, and/or other memory components. Memory 172 typically stores computer-executable instructions to be executed by processing element(s) 171 and/or data which is manipulated by processing element(s) 171 for implementing functionality in accordance with an embodiment. Storage device(s) 173 are another type of computer-readable medium, and typically comprise solid state storage media, disk drives, diskettes, networked services, tape drives, and other storage devices. Storage device(s) 173 typically store computer-executable instructions to be executed by processing element(s) 171 and/or data which is manipulated by processing element(s) 171 for implementing functionality in accordance with an embodiment.

Figure 2A:
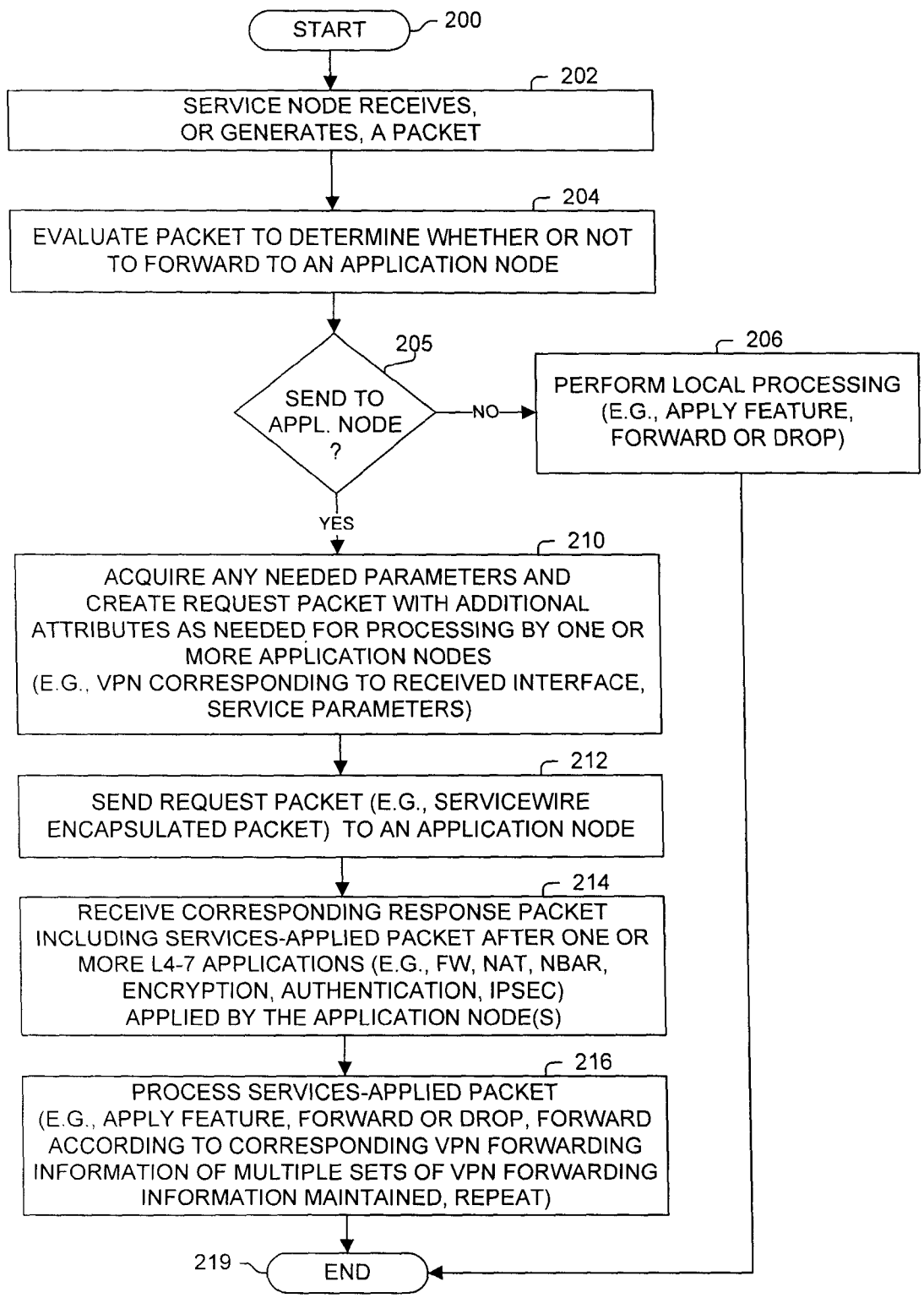
FIG. 2A illustrates a process performed in one embodiment.

FIG. 2A illustrates a process performed in one embodiment by a service node, such as, but not limited to, a packet switching device. Processing begins with process block 200. In process block 202, the service node receives or generates a packet. For example, the packet may be generated by the service node itself, or even by processing of another packet. In process block 204 (assuming it is not already known that the packet should be sent to an application node, e.g., based on a generated packet or all packets being sent to an application node), the packet is evaluated to determine whether or not it should be sent to an application node. As identified in process block 205, if the packet should not be sent to an application node, then in process block 206, normal local processing of the packet is performed (e.g., apply one or more features, forward or drop, etc.). Otherwise processing proceeds to process block 210, as process block 205 identified that the packet is to be sent to an application node for applying one or more Layer-4 to Layer-7 services by one or more application nodes to the packet.

Note, the use of the phrase "applying one or more services to the packet" includes a series of applications applied to the packet, with the packet possibly being modified between the application of some of these services such that one or more of the services is applied to a modified original packet. Further, examples of these Layer-4 to Layer-7 services include, but are not limited to, Firewall (FW), Network Address Translation (NAT), Network-based Application Recognition (NBAR), authentication, encryption and Internet Protocol Security (IPsec).

In process block 210, any parameters (e.g., VPN identification, specialized service parameters, label stacks, etc.) are acquired, and the request packet is created. The request packet includes the original packet, as well as other Service-Wire attributes, such as, but not limited to: an identification of one or more services to be applied to the packet, an identification of a virtual private network (VPN) associated with the packet (e.g., a VPN associated with an interface on which the packet was received), etc. In one embodiment, the service identification is a single value. In one embodiment, the service identification includes the identification of a generalized service (e.g., Firewall) and a specific service of the generalized service (e.g., inside-to-outside, outside-to-inside). Next, in process block 212, the request packet (e.g., a ServiceWire packet encapsulating the original packet) is sent to an application node. In process block 214, a response packet, corresponding to the sent request packet, is received, with the response packet being a ServiceWire packet encapsulating the services-applied packet corresponding to the original packet (i.e., the result of one or more services being applied to the original packet by one or more application nodes). In process block 216, the service node processes the services-applied packet. Examples of such processing include, but are not limited to: the service node applies one or more additional services to the services-applied packet; the service node forwarding or dropping the services-applied packet; the service node performing a lookup operation in the corresponding forwarding information for the VPN identified in the response packet from multiple sets of forwarding information maintained for different VPNs; repeat the process illustrated in FIG. 2A by returning to process block 204, etc. Processing of the flow diagram of FIG. 2A is represented by process block 219.

FIG. 2B illustrates a command 250, used in one embodiment, for configuring the service definition in a service node. As shown, command 250 includes:
- a user-defined name of the ServiceWire service (251);
- a user description/comment (252);
- application node definition (253) including the address of the application node to which to send a packet as well as the identification of the service(s) to be applied (e.g., which may be a specific service, or a generalized service and one or more values to define a specific service of the generalized service);
- backup application node definition (254); and
- mode hairpin (255) defining that the one or more application nodes will return a response packet including the services applied packet to the originating service node.

Next, FIG. 2C illustrates a ServiceWire request packet (280) used in one embodiment. As shown, request packet 280 encapsulates original packet 283, which is to have one or more services applied to it by one or more application nodes. In one embodiment, request packet 280 comprises one or more fields 281, which includes information to get the request packet from the service node to the first application node of one or more application nodes. The format of request packet 280 may be in one of an extensible number of formats, such as, but not limited to, MPLS, Ethernet, GRE, HDLC, PPP, etc., with one or more fields 281 conforming to the particular packet format. ServiceWire encapsulation 282 includes information required for defining the one or more applications to be applied to original packet 283, as well as possibly additional information (e.g., VPN information to be returned to the service node so it can properly forward a packet). In one embodiment such as when field 281 includes an MPLS label stack, field 282 has its first nibble as zero to identify ServiceWire encapsulation follows, when normally the first nibble would be four or six to identify an IPv4 or IPv6 packet is encapsulated. In one embodiment, ServiceWire encapsulation 282 encodes the ServiceWire information (e.g., identification of a service, identification of a general and specific services, VPN information, etc.) in one or more Type-Length-Value (TLV) structures.

Figure 3A:
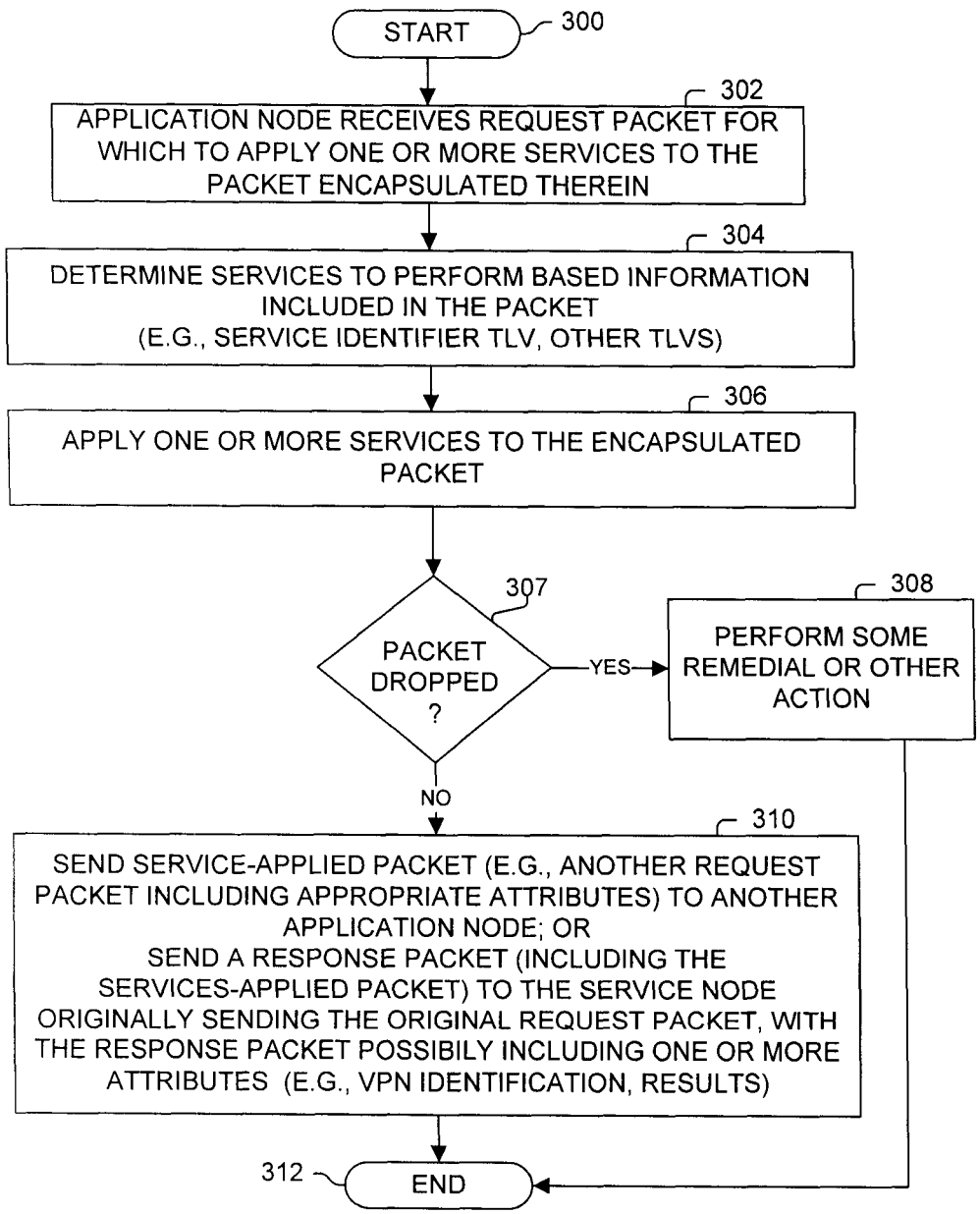
FIG. 3A illustrates a process performed in one embodiment.

FIG. 3A illustrates a process performed, in one embodiment, by an application node. Processing begins with process block 300. In process block 302, the application node receives the request packet for which to apply one or more services to the packet encapsulated therein. Typically, the application node is remote from the service node (e.g., communicatively coupled via a network external to the service and application nodes). In one embodiment, the service and application nodes are within a same packet switching appliance, such as with the application node being a blade server.

Next, in process block 304, the application node identifies, based on information included in the request packet (e.g., in the ServiceWire encapsulation) one or more services to apply to the encapsulated packet. In process block 306, the application node applies one or more of the identified service(s) to the encapsulated packet. As determined in process block 307, if the packet was dropped, then in process block 308, some remedial or other action is typically taken. Otherwise, in process block 310, the services-applied packet (e.g., the original packet or a modification thereof based on the application of one or more services) is sent in a request packet to another application node to apply one or more services; or the services-applied packet is sent in a response packet back to the originating service node. The response packet may include one or more attributes or other information, such as, but not limited to, an identification of a VPN associated with the services-applied packet (e.g., the same or different identifier identifying a VPN in the Service Wire or other encapsulation of the received request packet). Processing of the flow diagram of FIG. 3A is complete as indicated by process block 312.

Figures 3B, 3C:
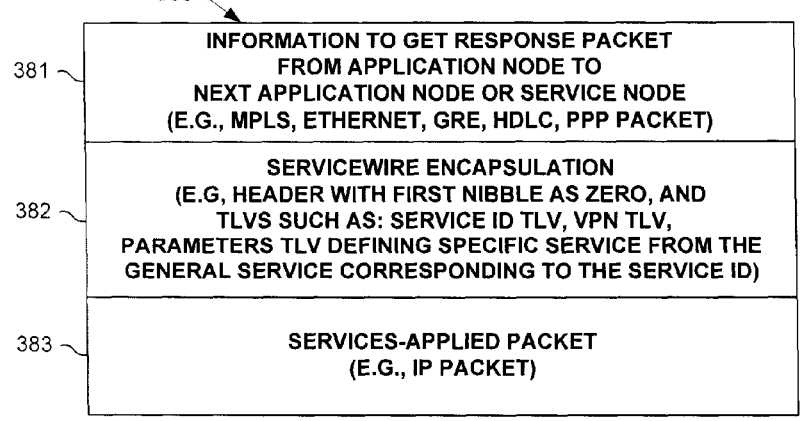
FIG. 3B illustrates a configuration process performed in one embodiment.
FIG. 3C illustrates a packet format used in one embodiment.

FIG. 3B illustrates a command 350, used in one embodiment, for configuring the service definition in an application node. As shown, command 350 includes:
- a user-defined name of the ServiceWire service (351);
- a user-defined description/comment (352);
- identification (353) of the service(s) to be applied (e.g., which may be a specific service, or a generalized service and one or more values to define a specific service of the generalized service), which corresponds the service identification in service node definition (253) in FIG. 2B;
- features (354) of the one or more services to be applied at an input-service-interface:
- features (355) of the one or more services to be applied at an output-service-interface; and
- optional forwarding information (356). If not included, a response packet will be created and sent to the originating service node. Otherwise, the nexthop keyword indicates a next application node in the service path (this is the service chaining case where the one or more services are applied by multiple application nodes). The optimize-l2 keyword enables a forwarding optimization for traffic received on native transport connections. When optimize-l2 is configured, an optimized forwarding mechanism that increases packet throughput is used for traffic received on native transport connections. The optimized forwarding mechanism is: swap the source and destination MAC addresses in the packet, and forward the packet back out the interface that it was received on. When the optional rewrite-service-id keyword is configured, the application node will use this as the identification (353) of the service to be applied by the next application node.

In one embodiment, when an application node sends a packet to another application node for applying additional services of the one or more services to be applied to a packet, it sends a request packet 280 of FIG. 2C to the next application node.

Next, FIG. 3C illustrates a ServiceWire response packet (380) used in one embodiment. As shown, response packet 380 encapsulates the services-applied packet 383, which is the original packet after having the one or more services applied to it by one or more application nodes. Thus, services-applied packet 383 packet can be the original packet, or a modification thereof resulting from the application of these services.

In one embodiment, response packet 380 comprises one or more fields 381, which includes information to get the response packet from the application node to the service node. The format of response packet 380 may be in one of an extensible number of formats, such as, but not limited to, MPLS, Ethernet, GRE, HDLC, PPP, etc., with one or more fields 381 conforming to the particular packet format. ServiceWire encapsulation 382 includes information for use by the service node in processing encapsulated services-applied packet 383 (e.g., VPN information so the service node can properly forward services-applied packet 383). In one embodiment such as when field 381 includes an MPLS label stack, field 382 has its first nibble as zero to identify ServiceWire encapsulation follows, when normally the first nibble would be four or six to identify an IPv4 or IPv6 packet is encapsulated. In one embodiment, ServiceWire encapsulation 382 encodes the ServiceWire information (e.g., identification of a service, identification of a general and specific services, VPN information, etc.) in one or more Type-Length-Value (TLV) structures.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
   maintaining, by a packet switching device, forwarding information for a plurality of virtual private networks (VPNs);
   receiving, by the packet switching device from another packet switching device via a network, a particular packet; and
   in response to determining by the packet switching device to apply one or more services to the particular packet by one or more application nodes located remotely from the packet switching device:
   creating, by the packet switching device, a request packet encapsulating the particular packet, and including a service identification of at least one service of one or more services to be applied to the particular packet by said one or more application nodes, and an identification of a particular VPN associated with the particular packet, with the service identification and the identification of the particular VPN said included in the request packet in fields not within the particular packet;
   forwarding, by the packet switching device, the request packet to a particular application node of said one or more application nodes, wherein each of said one or more application nodes is external to the packet switching device;
   receiving, by the packet switching device from an application node of said one or more application nodes, a response packet corresponding to said forwarded request packet, the response packet encapsulating a service-applied packet corresponding to the particular packet after said one or more services have been applied to the particular packet, not to the request packet, by said one or more application nodes, with the response packet including a particular identification of the particular VPN;
   extracting the service-applied packet from the response packet; and
   sending, by the packet switching device, the service-applied packet or a packet derived from the service-applied packet according to forwarding information for the particular VPN from the packet switching device;
   wherein the packet switching device, said another packet switching device, and each of said one or more application nodes are different stand-alone appliances communicatively coupled via one or more networks.

2. The method of claim 1, wherein said one or more services include at least one service from a group of services consisting of: layer-4, layer-5, layer-6, and layer-7 services.

3. The method of claim 1, wherein said one or more services include at least one service from a group of services consisting of: Firewall (FW), Network Address Translation (NAT), Network-based Application Recognition (NBAR), authentication, encryption and Internet Protocol Security (IPsec).

4. The method of claim 1, wherein the identification of the particular VPN is encoded in a type-length-value (TLV) element in the request packet; and wherein the particular identification of the particular VPN is encoded in a TLV element in the response packet.

5. The method of claim 4, wherein the identification of the particular VPN in the request packet and the particular identification of the particular VPN in the response packet are each encoded in a same type-length-value (TLV) element in the respective said request and response packets.

6. The method of claim 1, wherein the request packet includes a Multiprotocol Label Switching (MPLS) label stack for reaching the application node, immediately followed by a nibble of value zero identifying that the request packet has encoded therein service information, wherein said service information includes the service identification.

7. The method of claim 1, wherein the response packet includes a Multiprotocol Label Switching (MPLS) label stack for reaching the packet switching device, immediately followed by a nibble of value zero identifying that the response packet has encoded therein service information, wherein said service information includes the particular identification of the particular VPN.

8. A packet switching device, comprising:
   one or more storage devices configured for maintaining different forwarding information for each of a plurality of virtual private networks (VPNs);
   a first interface of a plurality of interfaces configured to receive a particular packet via a network from another packet switching device, with the first interface associated with a particular VPN of the plurality of VPNs;
   a classifier configured to determine, for a particular packet received on the first interface, to forward the particular packet to an application node of one or more application nodes, remote from the packet switching device, for applying one or more services to the particular packet by said one or more application nodes;

a packet processor configured to create a request packet corresponding to the particular packet in response to the classifier said determining to forward the particular packet to the application node, with the encapsulating the particular packet, and including a service identification of at least one service of said one or more services to be applied to the particular packet by said one or more application nodes, and an identification of the particular VPN, with the service identification and the identification of the particular VPN said included in the request packet in fields not within the particular packet; and a second interface of the plurality of interfaces configured to send the request packet to the application node;

wherein the packet switching device is configured to receive a response packet, corresponding to said sent request packet, on one of the plurality of interfaces, with the response packet encapsulating a service-applied packet corresponding to the particular packet after said one or more services have been applied to the particular packet, not to the request packet, by said one or more application nodes, with the response packet including a particular identification of the particular VPN; and wherein the packet switching device is configured to extract the service-applied packet from the response packet and to forward, from the packet switching device, the service-applied packet or a packet derived from the service-applied packet from one of the plurality of interfaces according to forwarding information for the particular VPN stored in at least one of said storage devices;

wherein the packet switching device, said another packet switching device, and each of said one or more application nodes are different stand-alone appliances communicatively coupled via one or more networks.

9. The packet switching device of claim 8, wherein said one or more services include at least one service from a group of services consisting of: layer-4, layer-5, layer-6, and layer-7 services.

10. The packet switching device of claim 8, wherein the identification of the particular VPN in the request packet and the particular identification of the particular VPN in the response packet are each encoded in a same type-length-value (TLV) element in the respective said request and response packets.

11. A method, comprising:

receiving, by an application node of one or more application nodes in a network from a particular service node different from said one or more application nodes, a request packet, including: a particular packet, a service identification of at least one service of one or more services to be applied to the particular packet by said one or more application nodes, and an identification of a particular virtual private network (VPN), with the service identification and the identification of the particular VPN said included in the request packet in fields not within the particular packet;

extracting the particular packet from said received request packet;

applying, by the application node based on the service identification said received in the request packet, said at least one service to the particular packet said received in the request packet, such that the result of said applying operation is a service-applied packet corresponding to the particular packet;

creating, by the application node, a response packet corresponding to said received request packet, with the response packet encapsulating the service-applied packet, and a particular identification of the particular VPN, such that a service node can determine the forwarding information corresponding to the particular VPN; and sending, from the application node, the response packet to: the particular service node, or another application node, external to the application node, for applying one or more additional services of said one or more services to the service-applied packet before a packet derived from the service-applied packet is communicated to the particular service node;

wherein the particular service node and the application node are different stand-alone appliances communicatively coupled via one or more networks.

12. The method of claim 11, wherein said operation of applying said at least one service to the particular packet includes applying said at least one service to the particular packet based on the particular VPN.

13. The method of claim 11, wherein the application node sends the response packet to the particular service node and not to said another application node.

14. The method of claim 11, wherein the request packet includes a Multiprotocol Label Switching (MPLS) label stack for reaching the application node, immediately followed by a nibble of value zero identifying that the request packet has encoded therein service information, wherein said service information includes the service identification.

15. The method of claim 11, comprising: identifying, by the application node based on a nibble of value zero immediately following a Multiprotocol Label Switching (MPLS) label stack for reaching the application node included in the request packet, that the request packet includes service information, wherein said service information includes the service identification and the identification of the particular VPN.

16. A method, comprising:

receiving, by a packet switching device from another packet switching device via a network, a particular packet; and in response to determining by the packet switching device to apply a general service to the particular packet by one or more application nodes located remotely from the packet switching device:

creating, by the packet switching device, a request packet encapsulating the particular packet, and including an identification of the general service to be applied to the particular packet by said one or more application nodes, and one or more service parameters for the general service defining a particular service of the general service, with the identification of the general service and said one or more service parameters said included in the request packet in fields not within the particular packet;

forwarding, by the packet switching device, the request packet to a particular application node of said one or more application nodes, wherein each of said one or more application nodes is external to the packet switching device;

receiving, by the packet switching device from an external source, a response packet corresponding to said forwarded request packet, the response packet encapsulating a service-applied packet corresponding to the particular packet after at least the particular service has been applied to the particular packet, not to the request packet, by said one or more application nodes;

extracting the service-applied packet from the response packet; and sending the service-applied packet or a packet derived from the service-applied packet from the packet switching device;

wherein the packet switching device, said another packet switching device, and each of said one or more application nodes are different stand-alone appliances communicatively coupled via one or more networks.

17. The method of claim 16, wherein the identification of the general service and said one or more service parameters for the general service are encoded in one or more type-length-value (TLV) elements in the request packet.

18. The method of claim 16, wherein the general service is a Firewall (FW) service.

19. The method of claim 16, comprising:
maintaining, by the packet switching device, forwarding information for a plurality of virtual private networks (VPNs);
wherein the request packet and the response packet each include an identification of a particular VPN of the plurality of VPNs, with the particular VPN associated with the particular packet; and
wherein said operation of sending the service-applied packet or a packet derived from the service-applied packet from the packet switching device is based on said maintained forwarding information for the particular VPN.

20. The method of claim 16, comprising: determining, by the packet switching device, to forward the particular packet to the particular application node for applying at least one of said one or more services to the particular packet by said one or more application nodes.

21. A method, comprising:
receiving, by an application node of one or more application nodes in a network, a request packet from a particular service node different from said one or more application nodes, including: a particular packet, an identification a general service to be applied to the particular packet by said one or more application nodes, and one or more service parameters for the general service defining a particular service of the general service, with the identification of the general service and said one or more service parameters said included in the request packet in fields not within the particular packet;
extracting the particular packet from said received request packet;
applying, by the application node, the particular service to the particular packet, such that the result of said applying operation is a service-applied packet corresponding to the particular packet;
creating, by the application node, a response packet corresponding to said received request packet, with the response packet encapsulating the service-applied packet; and
sending the response packet to: the particular service node, or another application node for applying one or more additional services of said one or more services to the service-applied packet before a packet derived from the service-applied packet is communicated to the particular service node;
wherein the particular service node and the application node are different stand-alone appliances communicatively coupled via one or more networks.

22. The method of claim 21, wherein the identification of the general service and said one or more service parameters for the general service are encoded in one or more type-length-value (TLV) elements in the request packet.

23. The method of claim 21, wherein the request packet and the response packet each include an identification of a particular virtual private network (VPN) of a plurality of VPNs, with the particular VPN associated with the particular packet.

24. The method of claim 23, wherein said application of the particular service to the particular packet is based on the particular VPN.

* * * * *